United States Patent [19]

Huber et al.

[11] Patent Number: 4,955,637
[45] Date of Patent: Sep. 11, 1990

[54] ANCHORING OF END POINTS OF SAFETY BELTS

[75] Inventors: Guntram Huber, Aidlingen; Walter Jahn, Ehningen, both of Fed. Rep. of Germany

[73] Assignee: Daimler-Benz AG, Suttgart, Fed. Rep. of Germany

[21] Appl. No.: 404,412

[22] Filed: Sep. 8, 1989

[30] Foreign Application Priority Data

Sep. 14, 1988 [DE] Fed. Rep. of Germany ....... 3831199

[51] Int. Cl.$^5$ ............................................ G60R 22/22
[52] U.S. Cl. ..................................... 280/801; 296/189
[58] Field of Search .......................... 280/801; 296/189

[56] References Cited

U.S. PATENT DOCUMENTS 4,331,349 5/1982 Funahashi ........................... 280/801

FOREIGN PATENT DOCUMENTS 2358232 6/1974 Fed. Rep. of Germany .
46949 2/1988 Japan .................................... 280/801

Primary Examiner—Richard A. Bertsch
Assistant Examiner—Tamara L. Finlay
Attorney, Agent, or Firm—Evenson, Wands, Edwards, Lenahan & McKeown

[57] ABSTRACT

The application relates to an anchoring of end points of safety belts or safety belt buckle attachments for rear seats of motor vehicles with rear-wheel drive, especially passenger vehicles or estate cars, in the vehicle floor region. In order to stiffen such an anchoring so that the mounting points cannot travel in the direction of the tensile forces occuring in the case of stressing as a result of an accident, the invention provides for the end points, together with a bridge passing under a drive shaft, to be fixed to the vehicle floor on both sides of the drive shaft.

3 Claims, 1 Drawing Sheet

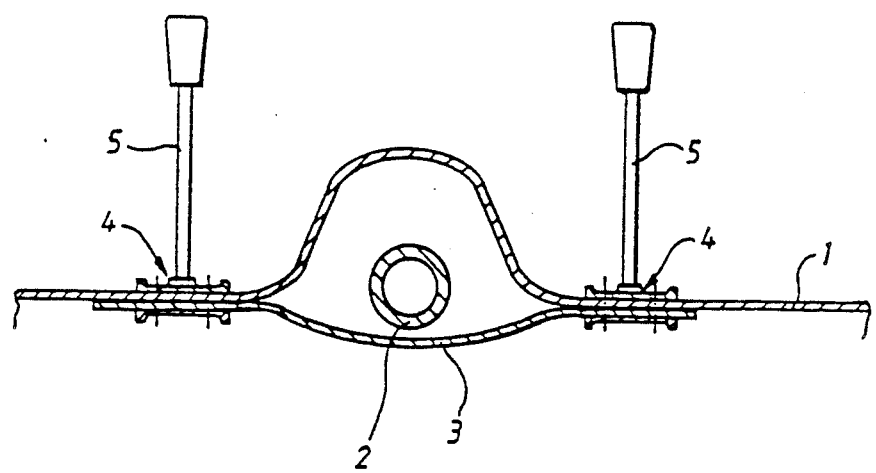

ANCHORING OF END POINTS OF SAFETY BELTS

BACKGROUND AND SUMMARY OF THE INVENTION

The invention relates to an anchoring of end points of safety belts of safety belt buckle attachments for rear seats of motor vehicles with rear-wheel drive, especially passenger vehicles or estate cars, in the vehicle floor region.

As a result of such anchorings, in the case of an accident such considerable forces are introduced into the vehicle floor that the latter can be pulled upwards, the consequence of which is that an additional movement is available to the vehicle passengers despite the wearing of belts. This leads to an undesired sequence of movements of the bodies of the vehicle passengers, and in some circumstances to so-called "submarining".

An object of the present invention is therefore to rectify this defect and to ensure that the belt mounting points can execute virtually no movement in the direction of the tensile forces occurring in the case of an accident.

This object is achieved according to the invention with a belt anchoring of the generic type in that the end points, together with a bridge passing under a drive shaft, are fixed to the vehicle floor on both sides of the drive shaft.

The bridge is designed here preferably as a sheet-metal bending part of sheet-metal stamping.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic partial vertical section in a vehicle transverse plane through a belt mounting region constructed in accordance with a preferred embodiment of the invention.

DETAILED DESCRIPTION OF THE DRAWING

A drive shaft 2 running under a vehicle floor 1 is shown in the drawing. A bridge 3 passes under the drive shaft 2 at a close distance only and is screwed to the vehicle floor 1 on both sides together with the end points 4 of two belt buckle attachments 5.

In the case of great stressing of the belt buckle attachments 5, after only slight deformation of the vehicle floor 1 the bridge 3 comes to abut against the underside of the drive shaft 2, which is after all then stationary, and braces itself against the latter. The effect id additionally favored by the fact that the drive shaft 2 usually moves slightly downwards in the region under consideration here in the case of a violent head-on collision of the vehicle, so that it virtually comes towards the bridge 3, so that a reinforcing can occur in some circumstances even prior to a deformation of the vehicle floor 1.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Anchoring arrangement for end points of safety belts or safety belt buckle attachments for rear seats of motor vehicles with rear-wheel drive, in the vehicle floor region, wherein the end points, together with a bridge passing under a drive shaft at a close distance, are fixed to the vehicle floor on both sides of the drive shaft so that when the end points are greatly stressed the drive shaft is also used for load bearing.

2. Anchoring according to claim 1, wherein the bridge is designed as a sheet-metal bending part.

3. Anchoring according to claim 1, wherein the bridge is designed as sheet-metal stamping.

* * * * *